(12) United States Patent  (10) Patent No.: US 6,195,114 B1
Fujita                    (45) Date of Patent: Feb. 27, 2001

(54) METHOD OF DRIVING OPTICAL OUTPUT MEDIA IN AN OPTICAL WRITING APPARATUS

(75) Inventor: Atsushi Fujita, Kusatsu (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/294,393

(22) Filed: Apr. 20, 1999

(30) Foreign Application Priority Data

Apr. 21, 1998 (JP) .................................................. 10-110803

(51) Int. Cl.[7] ...................................................... B41J 2/47
(52) U.S. Cl. .......................... 347/237; 347/238; 347/247; 347/248
(58) Field of Search .................................... 347/237, 238, 347/247, 248, 240; 345/97, 84, 204; 430/30; 349/2, 3

(56) References Cited

U.S. PATENT DOCUMENTS 5,592,192 * 1/1997 Kanbe et al. ............................ 345/97
5,699,103 * 12/1997 Fleming ................................ 347/240
5,728,495 * 3/1998 Ozawa ................................... 430/30
5,912,694 * 6/1999 Miyake et al. ........................ 347/247

FOREIGN PATENT DOCUMENTS 9-277598   10/1997 (JP) .

* cited by examiner

Primary Examiner—N. Le
Assistant Examiner—Hai C. Pham
(74) Attorney, Agent, or Firm—McDermott, Will & Emery

(57) ABSTRACT

In a method of driving a plurality of optical output media aligned in one direction in an optical writing apparatus that drives activation and deactivation of the optical output media based on image data to thereby perform optical writing onto an object onto which writing is to be performed, it is determined whether the number of optical output media that are writing-driven based on the image data in order to perform optical writing onto the object is smaller than the total number of optical output media, and when the number of writing-driven optical output media is smaller than the total number of optical output media, non-writing driving of optical output media other than the writing-driven optical output media is performed. The non-writing driving is a driving in which optical writing is not performed onto the object.

12 Claims, 17 Drawing Sheets

METHOD OF DRIVING OPTICAL OUTPUT MEDIA IN AN OPTICAL WRITING APPARATUS

This application is based on application No. H10-110803 filed in Japan, the entire content of which is hereby incorporated by reference.

BACKGROUND OF THE INVENTION

1. Field of the Invention

The present invention relates to a method of driving optical output media in an optical writing apparatus, said apparatus being used for digital printers and the like.

2. Description of the Prior Art

As a solid-state scanning optical writing apparatus, an array type using optical output media such as LEDs, PLZT, fluorescers and liquid crystal, etc. aligned in one direction has conventionally been known.

For example, an optical shutter using PLZT as an example of the optical output medium is provided as a ceramic wafer comprising lead, lanthanum, zircon and titanium that are sintered, and is cut out or arranged so as to have a pixel pitch for the necessary printing density and resolution. The PLZT optical shutter transmits or does not transmit light according to the polarization direction of the light between when a voltage is applied and when no voltage is applied. Therefore, the PLZT optical shutter transmits or intercepts light from a light source according to whether a voltage is applied or not, and outputs the transmitted light. For this reason, no special light source is necessary. In addition, the PLZT optical shutter has a responsiveness of as high as in nanoseconds, and easily handles an increase in writing speed.

The inventor has developed a solid-state scanning optical writing apparatus using PLZT optical shutters as optical output media, that is, an A3-ready sliver halide printer employing a print head. In such a printer, in addition to the formation of A3-size images, the formation of images of a small size such as the L size in photography is naturally performed.

When a large-size image is printed after a small-size image is printed on photographic paper, there are occasions when there is a difference in output density on the same photographic paper between the part of the large-size image coinciding with the small-size image printed therebefore and the part of the large-size image not coinciding with the small-size image.

As a result of various experiments and examinations conducted by the inventor, it was found that the output density difference is caused due to an electro-optic effect, that is, an optical hysteresis and an electric field hysteresis of the PLZT optical shutter. FIG. 17 shows results of a measurement of the difference in quantity of the transmitted light with respect to the drive voltage between before and after the hysteresis due to the electric field. FIG. 18 shows results of a measurement of the difference in quantity of the transmitted light with respect to the drive voltage between before and after the hysteresis due to light. In either case, it is apparent that the drive voltage is changed by the hysteresis. FIG. 19 shows that the drive voltage varies with time due to the electric field hysteresis.

Thus, in the PLZT, when the hysteresis is caused, a value called a halfwave voltage where the quantity of the transmitted light is largest is varied, and this results in image writing non-uniformness and image output density non-uniformness. When the applied voltage is high or when an electric field is steadily applied like in a DC state, as shown in FIG. 19, the hysteresis quickly progresses.

SUMMARY OF THE INVENTION

An object of the present invention is to provide a driving method in which writing non-uniformness is prevented even when a difference in optical hysteresis or electric field hysteresis is caused in the optical output media in a solid-state scanning optical writing apparatus.

To achieve the above-mentioned object, in a method, according to one aspect of the present invention, of driving a plurality of optical output media aligned in one direction in an optical writing apparatus that drives activation and deactivation of the optical output media based on image data to thereby perform optical writing onto an object onto which writing is to be performed, it is determined whether the number of optical output media that are writing-driven based on the image data in order to perform optical writing onto the object is smaller than the total number of optical output media, and when the number of writing-driven optical output media is smaller than the total number of optical output media, non-writing driving of optical output media other than the writing-driven optical output media is performed. The non-writing driving is a driving in which optical writing is not performed onto the object.

In a method, according to another aspect of the present invention, of driving a plurality of optical output media aligned in one direction in an optical writing apparatus that drives activation and deactivation of the optical output media based on image data to thereby perform optical writing onto an object onto which writing is to be performed, when writing driving of optical output media is performed based on the image data in order to perform optical writing onto the object, a total drive time of each of the writing-driven optical output media is computed, the computed total drive time is stored, and when the number of writing-driven optical output media is smaller than the total number of optical output media, non-writing driving of the writing-driven optical output media and optical output media other than the writing-driven optical output media is performed based on the total drive time of each optical output medium stored before so that the total drive times of all the optical output media are the same. The non-writing driving is a driving in which optical writing is not performed onto the object.

In a method, according to still another aspect of the present invention, of driving a plurality of optical output media aligned in one direction in an optical writing apparatus that drives activation and deactivation of the optical output media based on image data to thereby perform optical writing onto an object onto which writing is to be performed, when writing driving of optical output media is performed based on the image data in order to perform optical writing onto the object, an average total drive time of the writing-driven optical output media is computed, the computed average total drive time is stored, and when the number of writing-driven optical output media is smaller than the total number of optical output media, non-writing driving of optical output media other than the writing-driven optical output media is performed for a time equal to the average total drive time stored before. The non-writing driving is a driving in which optical writing is not performed onto the object.

In a method, according to a further aspect of the present invention, of driving a plurality of optical output media aligned in one direction in an optical writing apparatus that drives activation and deactivation of the optical output media based on image data to thereby perform optical writing onto an object onto which writing is to be performed, a preliminary driving of all the optical output media is performed before optical writing is performed onto the object based on the image data, wherein in said preliminary driving, non-writing driving of all the optical output media is performed at a predetermined voltage for a predetermined time, and after the preliminary driving, writing-driving of the optical output media is performed based on the image data in order to perform optical writing onto the object. The non-writing driving is a driving in which optical writing is not performed onto the object.

In a method, according to a further aspect of the present invention, of driving a plurality of optical output media aligned in one direction in an optical writing apparatus that drives activation and deactivation of the optical output media based on image data to thereby perform optical writing onto an object onto which writing is to be performed, when writing driving of optical output media is performed based on the image data in order to perform optical writing onto the object, it is determined whether the number of optical output media to be driven in present optical writing is greater than the number of optical output media writing-driven in preceding optical writing, and when the number of optical output media to be driven in the present optical writing is greater than the number of optical output media writing-driven in the preceding optical writing, writing driving for the present optical writing is performed while calibrating a difference in writing characteristic due to a difference in hysteresis between optical output media being driven both in the preceding and the present optical writings and optical output media being driven only in the present optical writing.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Hereinafter, an embodiment of the present invention will be described together with examples thereof with reference to FIGS. 1 to 16 for understanding of the present invention.

Figure 3:
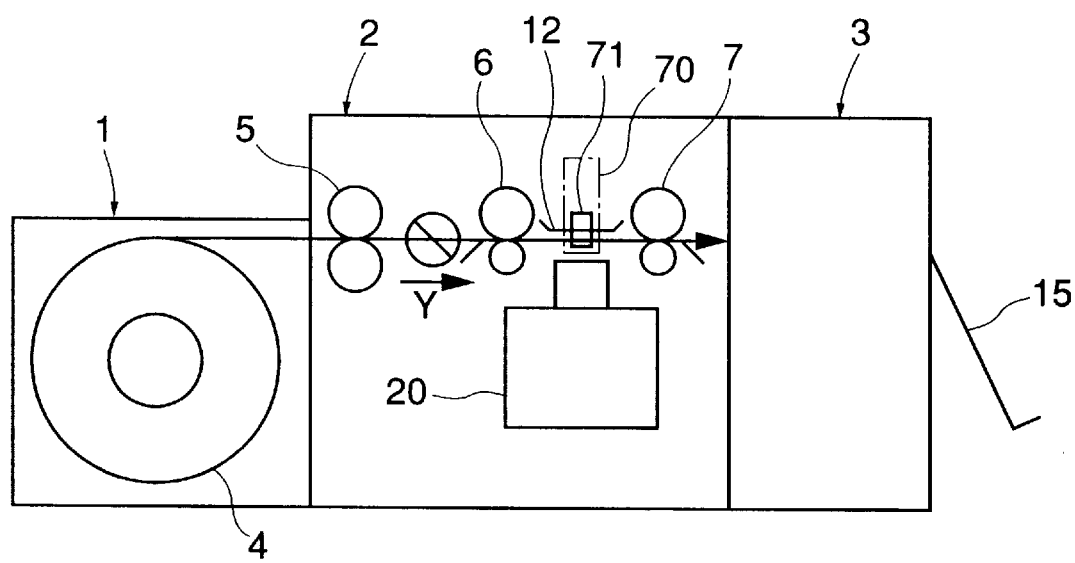
FIG. 3 briefly shows the structure of a silver halide printer employing the PLZT print head of FIG. 1.

This embodiment is an example for a case in which the present invention is applied to a solid-state scanning optical writing apparatus (hereinafter, referred to as PLZT print head) using PLZT optical shutters as optical output media and optical writing is performed onto silver halide photographic paper 4 to form color images as a silver halide printer as shown in FIG. 3. In this apparatus example, a roll of photographic paper 4 is drawn out of a housing 1 by conveyer rollers 5 and sent out to an optical writing section 12 in an exposure section 2 where a PLZT print head 20 is situated. In the optical writing section 12, optical writing of a color image is performed by the PLZT print head 20 while the photographic paper 4 is being precisely conveyed in the Y direction by conveyer rollers 6 and 7. After the writing, the photographic paper 4 is sent out to a succeeding post-processing section 3 and undergoes necessary post-processings such as development, fixing, cleaning and drying to reproduce a color image. Then, the photographic paper 4 is discharged onto a discharge tray 15. However, needless to say, the present invention is not limited thereto but is applicable to any types of solid-state scanning optical writing apparatuses using optical output media having a similar problem and having already been known or being to be developed in the future which media are capable of activation and deactivation control of optical outputs. The examples of the optical output media include illuminants and light transmitters, and light reflectors in some cases, such as LEDs, phosphors and liquid crystal. The type of the object onto which optical writing is to be performed is not limited as long as the object has a photosensitive characteristic.

Figure 1:
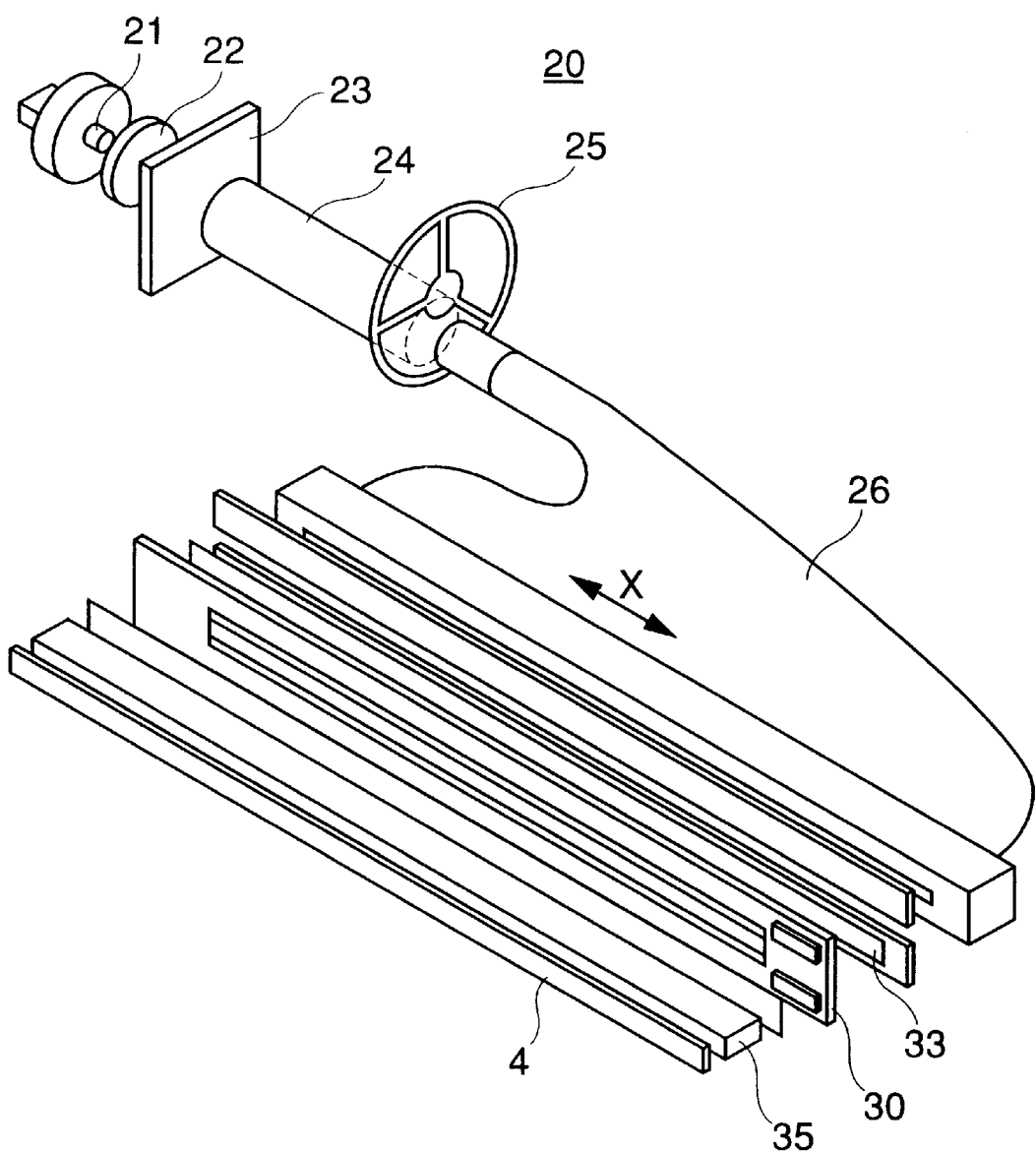
FIG. 1 is an exploded perspective view of a PLZT print head as an example of a solid-state scanning optical writing apparatus which is an object to be driven in an embodiment of the present invention.

The PLZT print head 20 shown in FIG. 1 is capable of optical writing of color images, and uses light from a normal halogen lamp 21 by switching among three colors of red, blue and green according to the need by a rotation of a color filter 22. Light having passed through the color filter 22 is heat-insulation-treated by being passed through a heat absorbing filter 23, and is then formed into uniform dispersed light by being passed through a glass rod 24 and a high speed rotary disk 25 that rotates at a high speed such as 1200 rpm. Then, the light is directed through a light guide 26 such as an optical fiber to each of PLZT optical shutters $B_1$ to $B_n$ and $A_1$ to $A_n$ each corresponding to one pixel.

Figure 2:
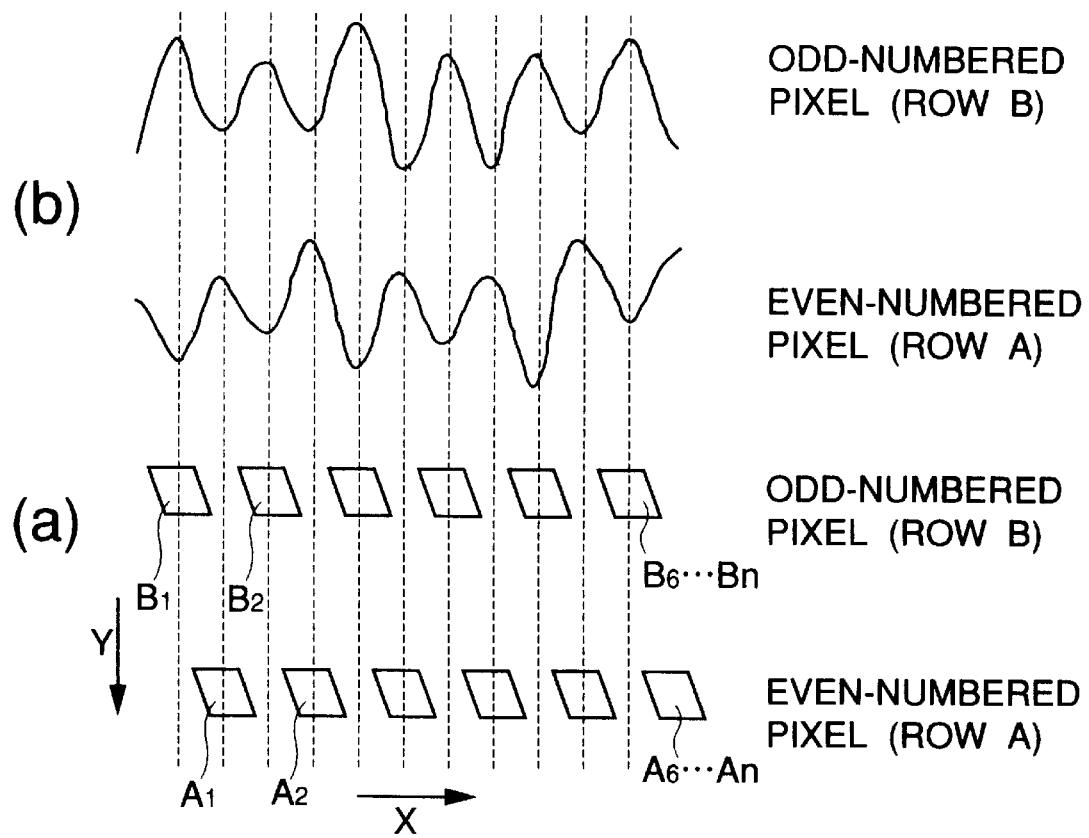
FIG. 2 shows PLZT optical shutters of the PLZT print head of FIG. 1 and the outputs thereof, (a) of which shows the arrangement of the PLZT optical shutters and (b) of which shows the condition of the outputs in accordance with the arrangement of the PLZT optical shutters.

Here, the PLZT optical shutters $B_1$ to $B_n$ and $A_1$ to $A_n$ are provided as ceramic wafers comprising lead, lanthanum, zircon and titanium that are sintered. As an example, in order to handle the printing density and resolution of 400 dpi, a fine processing is performed in which the wafers are cut out so as to form a staggered arrangement where optical shutters aligned in one direction with the same pitch in two rows of an odd row B and an even row A as shown in (a) of FIG. 2 are shifted from each other by a half pitch. However, this is not essential.

The PLZT optical shutters $B_1$ to $B_n$ and $A_1$ to $A_n$ in the rows are used for optical writing of every other pixel in the X direction in which they are aligned. The photographic paper 4 which is the object onto which optical writing is to be performed successively undergoes optical writing in the X direction to write an image while being conveyed in the Y direction perpendicular to the X direction. Normally, the X direction is a main scanning direction, and the Y direction is a sub-scanning direction. Since there is a difference in timing of writing onto the photographic paper 4 between the PLZT optical shutters $A_1$ to $A_n$ in the row in the downstream side in the conveyance direction of the photographic paper 4 and the PLZT optical shutters $B_1$ to $B_n$ in the row in the upstream side, the writing timing is adjusted accordingly. The optical output distribution condition of the PLZT print head 20 when the PLZT optical shutters $B_1$ to $B_n$ and $A_1$ to $A_n$ in the rows are activated is shown in (b) of FIG. 2.

The PLZT optical shutters $B_1$ to $B_n$ and $A_1$ to $A_n$ are mounted on a PLZT module board 30 shown in FIG. 1 together with an IC for driving them, and transmit or do not transmit light according to the polarization direction of light between when a voltage is applied and when no voltage is applied. To use a characteristic of this, the light directed by the light guide 26 is made incident on the PLZT optical shutters $B_1$ to $B_n$ and $A_1$ to $A_n$ through a polarizing plate 33. Consequently, the PLZT optical shutters $B_1$ to $B_n$ and $A_1$ to $A_n$ transmit light when a voltage is applied and intercepts light when the voltage is turned off. The optical output transmitted by the PLZT optical shutters $B_1$ to $B_n$ and $A_1$ to $A_n$ being activated is imaged onto the photographic paper 4 through a SELFOC lens array 35 which is an example of a unity-magnification imaging lens, thereby performing the optical writing.

Here, as the gradation of the optical writing, in order that writing of color images which are multi-value images can be performed, a 1024-step gradation is used as an example. Such light quantity gradation at the time of optical writing can freely be obtained by modulating one or both of the light transmittancy and the drive time by the voltage for driving the PLZT optical shutters $B_1$ to $B_n$ and $A_1$ to $A_n$ even when the light quantity of the light source such as the halogen lamp 21 is constant. When illuminants are used as the optical output media, necessary gradation is obtained by modulating one or both of the light emission quantity and the light emission time of the illuminants.

Figure 4:
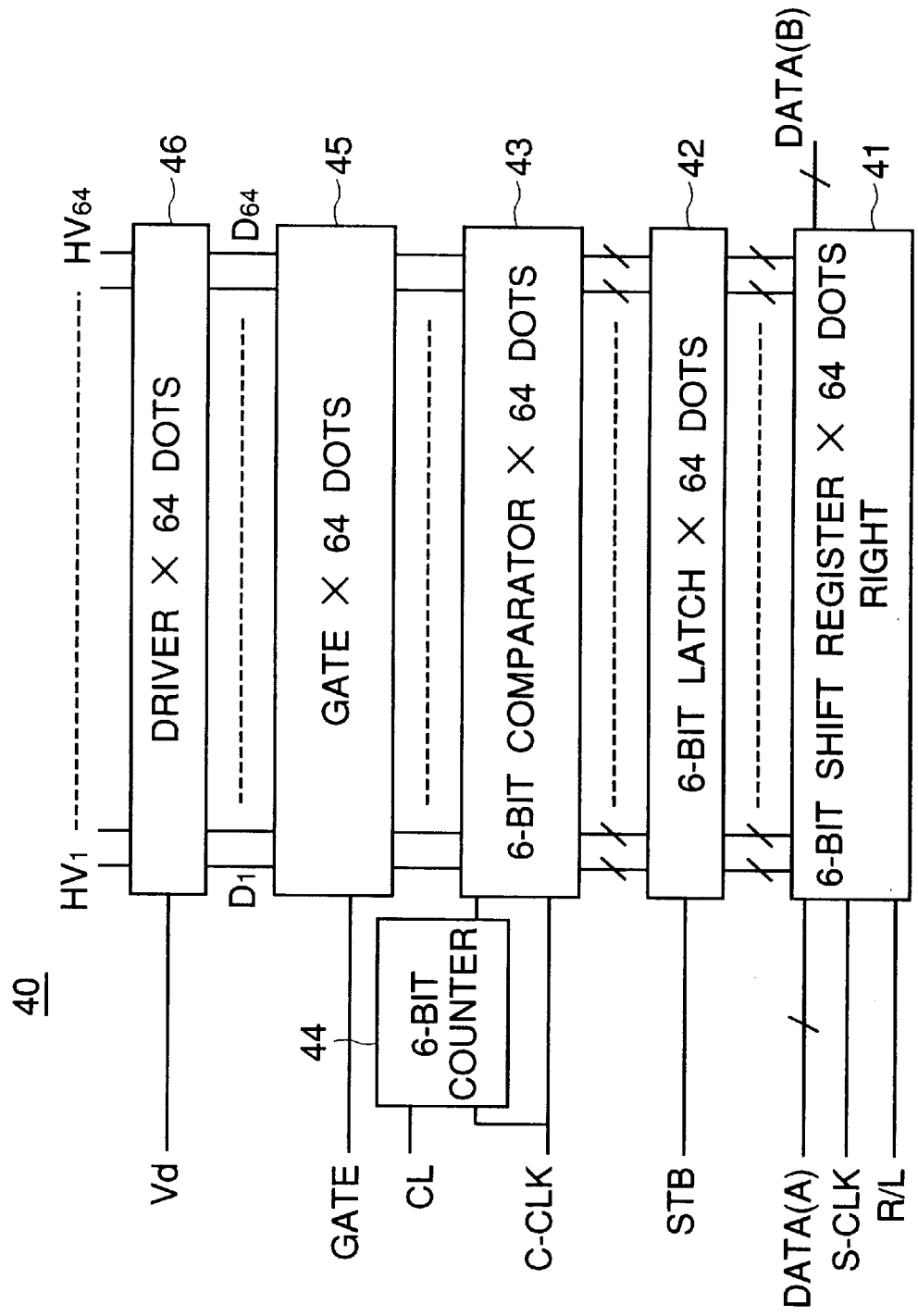
FIG. 4 is a block diagram of a driver IC for driving the PLZT print head.

In this embodiment, the 1024-step gradation is obtained by modulating the drive time of the PLZT optical shutters $B_1$ to $B_n$ and $A_1$ to $A_n$ by a drive pulse width set in correspondence with the light quantity level. For such multi-value image reproduction, a driver IC 40 as shown in FIG. 4 is used as an example, and in one driver IC 40, image data of, for example, 6 bits and 64 dots are handled. To a shift register 41, image data corresponding to the PLZT optical shutters $B_1$ to $B_n$ in the row B or image data corresponding to the PLZT optical shutters $A_1$ to $A_n$ in the row A are input based on switching between R and L and a clock S-CLK.

When the input of the data is finished, data in the shift register 41 are input to a comparator 43 through a latch 42 under the control of a strobe signal STB. In conjunction with a 6-bit counter 44, the comparator 43 counts the light quantity level of the input image data as a digital value to be converted into the drive time based on a count clock C-CLK and a count signal CL corresponding to the predetermined number of steps of gradation.

Figure 5:
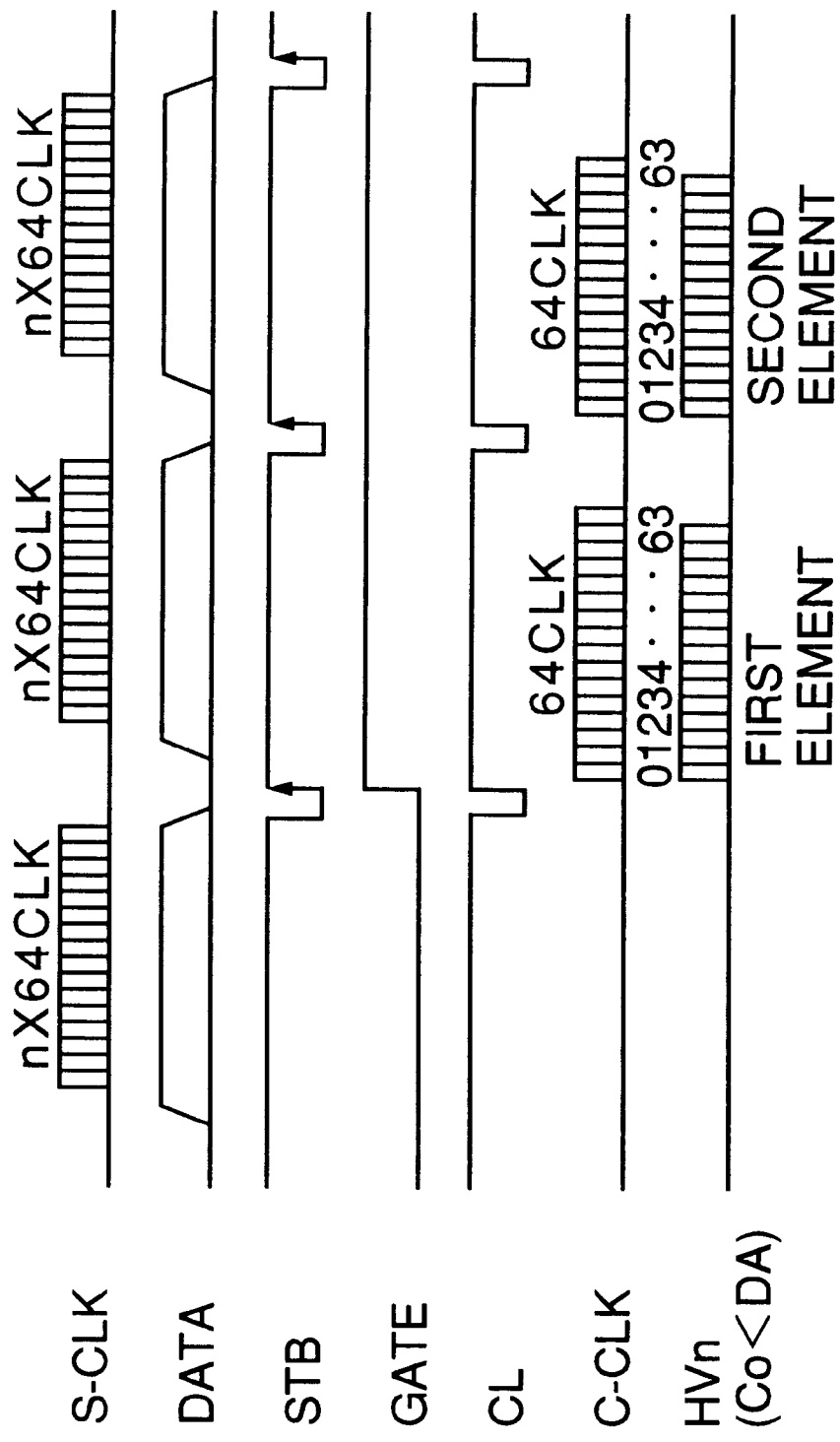
FIG. 5 is a time chart of an operation of the driver IC of FIG. 4.

The count data are output to a driver 46 through a gate 45 under the control of a gate signal GATE, and the corresponding ones of the optical shutters $B_1$ to $B_n$ and $A_1$ to $A_n$ are driven under a preset drive voltage Vd for a time corresponding to the light quantity level of the image data so that the optical output of the gradation corresponding to the image data is obtained. FIG. 5 shows a time chart of this control.

However, as mentioned above, in the PLZT optical shutters $B_1$ to $B_n$ and $A_1$ to $A_n$ provided so as to correspond to the optical writing pixels of the PLZT print head 20, a hysteresis due to light or an electric field at the time of optical writing is caused, and because of this, a difference corresponding to the difference among writing areas used for writing, at different times, of the images of the PLZT optical shutters aligned in the X direction is caused due to the difference in size among written images, so that writing non-uniformness is caused when a writing area and the next writing area having different degrees of hysteresis overlap each other.

Figure 6:
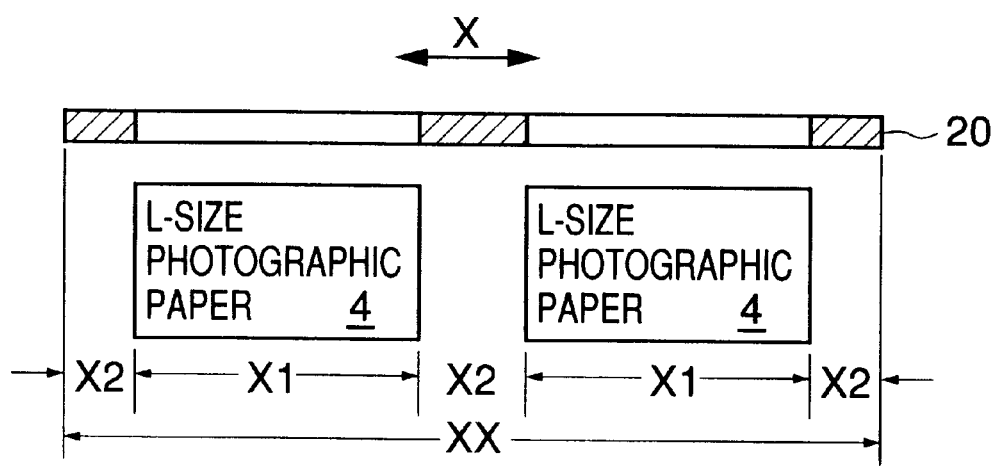
FIG. 6 is an explanatory view showing a driving method of an example of the embodiment.
Figure 7:
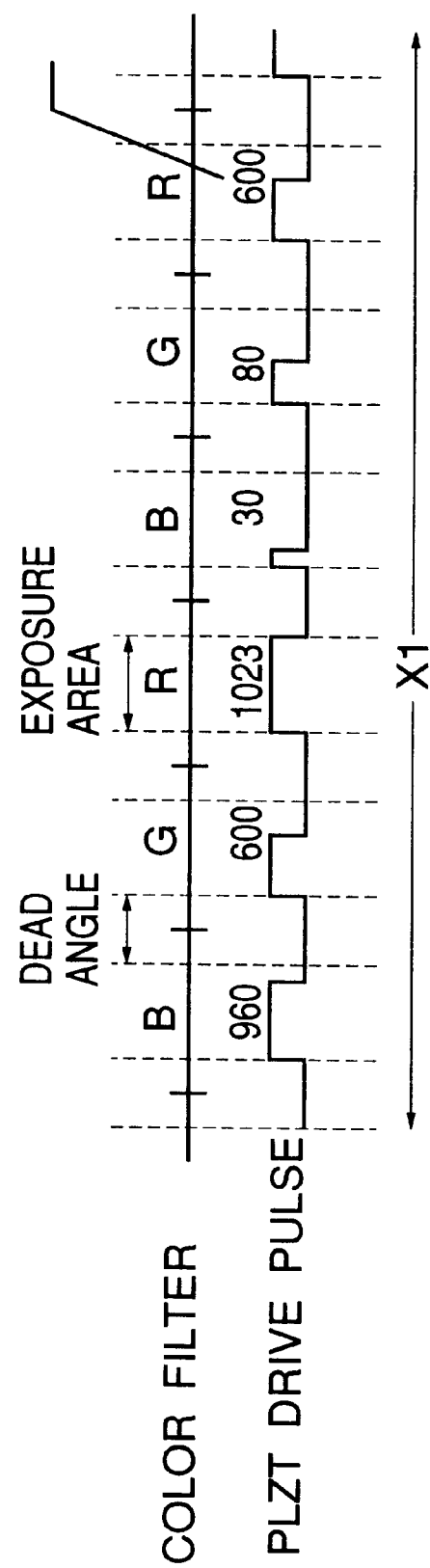
FIG. 7 is a time chart showing writing gradation data at each pixel in a writing area and a drive pulse corresponding to the data in the example of FIG. 6.
Figure 8:
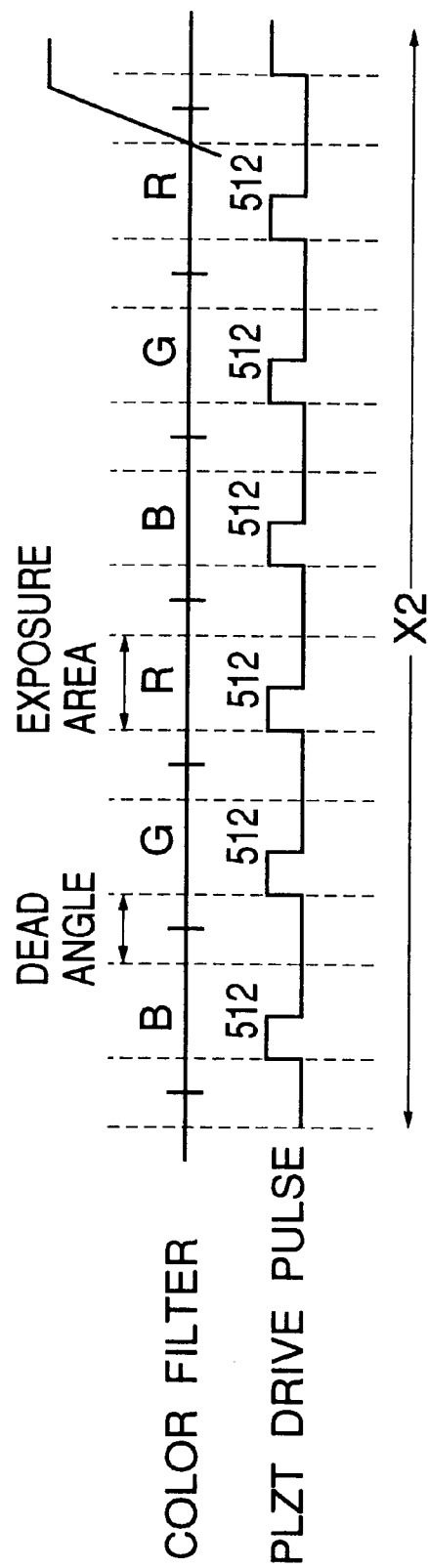
FIG. 8 is a time chart showing gradation data and a drive pulse at the time of non-writing driving for interpolation driving of a PLZT optical shutter at each pixel in a non-writing area in the example of FIG. 6.

In the example of this embodiment shown in FIGS. 6 to 8 that prevents this, as shown in FIG. 6, in the entire pixel area XX of the PLZT print head 20 in the X direction, in a case in which the number of pixels where the PLZT optical shutters $B_1$ to $B_n$ and $A_1$ to $A_n$ are driven in at least one writing area X1 where image writing is performed is smaller than the total number of pixels of the PLZT print head 20, when ones, of the PLZT optical shutters $B_1$ to $B_n$ and $A_1$ to $A_n$ in the entire pixel area XX, that correspond to the writing area X1 are writing-driven, of the PLZT optical shutters $B_1$ to $B_n$ and $A_1$ to $A_n$ corresponding to all the pixels, ones that correspond to a non-writing area X2 are driven under a condition where they are not opposed to the photographic paper 4 which is the object onto which writing is to be performed, that is, under a condition where the object is absent. In this specification, a driving in which no optical writing is performed onto the object is called a non-writing driving, whereas a driving for performing optical writing onto the object based on the image data is called writing driving. Showing one example data, the entire pixel range XX of the PLZT print head 20 corresponds to the width of the A3 size. On the contrary, the photographic paper 4 onto which printing is performed by optical writing is of L size in photography and in order to effectively use the entire pixel area XX, printing is simultaneously performed onto two pieces of photographic paper 4 by passing them in parallel. However, three non-writing areas X2 are present.

Thus, even when optical writing by driving the PLZT optical shutters $B_1$ to $B_n$ and $A_1$ to $A_n$ of the PLZT print head 20 is performed in the small writing area X1 where at least one non-writing area X2 including PLZT optical shutters not being driven is present in the entire pixel area XX, since the PLZT optical shutters in the non-writing area X2 are non-writing-driven, the difference in hysteresis due to the difference in driving can be prevented from being caused between the PLZT optical shutters in the writing area X1 and the PLZT optical shutters in the non-writing area X2 without any influence on the image writing.

FIGS. 7 and 8 show example data of this case. In FIGS. 7 and 8, cases are shown in which writing is performed by switching the PLZT optical shutters $B_1$ to $B_n$ and $A_1$ to $A_n$ aligned in the X direction by the color filter 22 in the order of R, G and B for each one of the pixels in the X direction.

The writing driving in the writing area X1 shown in FIG. 7 is performed, by a PLZT drive pulse having its width modulated in accordance with the image data, in a different gradation corresponding to the light quantity level of each pixel of the image data. On the contrary, in the non-writing driving in the non-writing area X2 shown in FIG. 8, the corresponding one of the PLZT optical shutters $B_1$ to $B_n$ and $A_1$ to $A_n$ is non-writing-driven in 512 steps of gradation at each pixel with the width of the PLZT drive pulse being unified to substantially ½ the maximum gradation while performing switching among R, G and B in a manner similar to that in the case of the writing in the writing area X1.

Like in the example of the writing driving in the writing area X1 shown in FIG. 7, the writing driving does not always become, for example, 1024 which is 100% in the case of a multi-value image like a color image in the writing area X1 in which image writing is performed. Therefore, as one approximation, only by uniformly controlling the non-writing driving of the PLZT optical shutters in the non-writing area X2 so that the exposure amount is substantially 50% of the maximum exposure amount in the writing driving of the PLZT optical shutters in the writing area X1, the difference in hysteresis can substantially be eliminated. It is preferred for the exposure amount to be decided based on the exposure time when the necessary gradation is obtained by modulating the exposure time like in this embodiment; however, the present invention is not limited thereto. For example, the exposure time can be decided based on the drive voltage of the PLZT optical shutters $B_1$ to $B_n$ and $A_1$ to $A_n$. Moreover, this can be performed by modulating both the exposure time and the drive voltage.

The writing driving in the writing area X1 is defined as a normal driving. The driving for eliminating the difference in hysteresis between the PLZT optical shutters $B_1$ to $B_n$ and $A_1$ to $A_n$ in the writing area X1 and in the non-writing area X2 is defined as an interpolation driving. The interpolation driving includes not only the non-writing driving of the PLZT optical shutter in the non-writing area as described above but also drivings for eliminating the difference in hysteresis by other methods described later.

Figure 9:
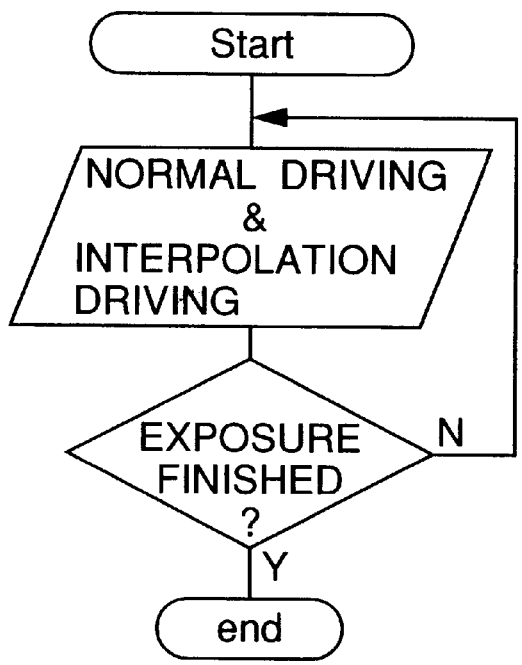
FIG. 9 is a flowchart of an example in which the interpolation driving is performed in the same period as a writing driving in the writing area.
Figure 10:
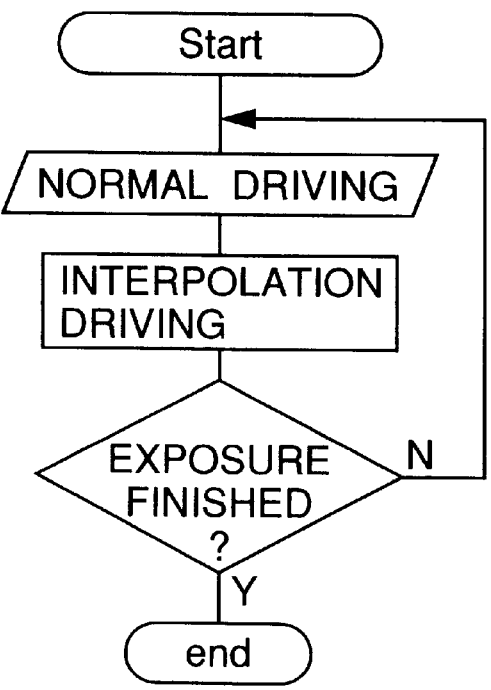
FIG. 10 is a flowchart of an example in which the interpolation driving is performed after the writing driving in the writing area or between the writing drivings.

With respect to the interpolation driving, as shown in FIG. 9, the writing driving of the PLZT optical shutters in the writing area X1, that is, the normal driving and the interpolation driving by the non-writing driving of the PLZT optical shutters in the non-writing area X2 may be performed in the same period, or as shown in FIG. 10, the interpolation driving may be performed after the normal driving to perform writing driving for forming one sheet of image, or between the normal drivings. The driving timing is applicable to cases in which other interpolation driving methods are used.

Figure 11:
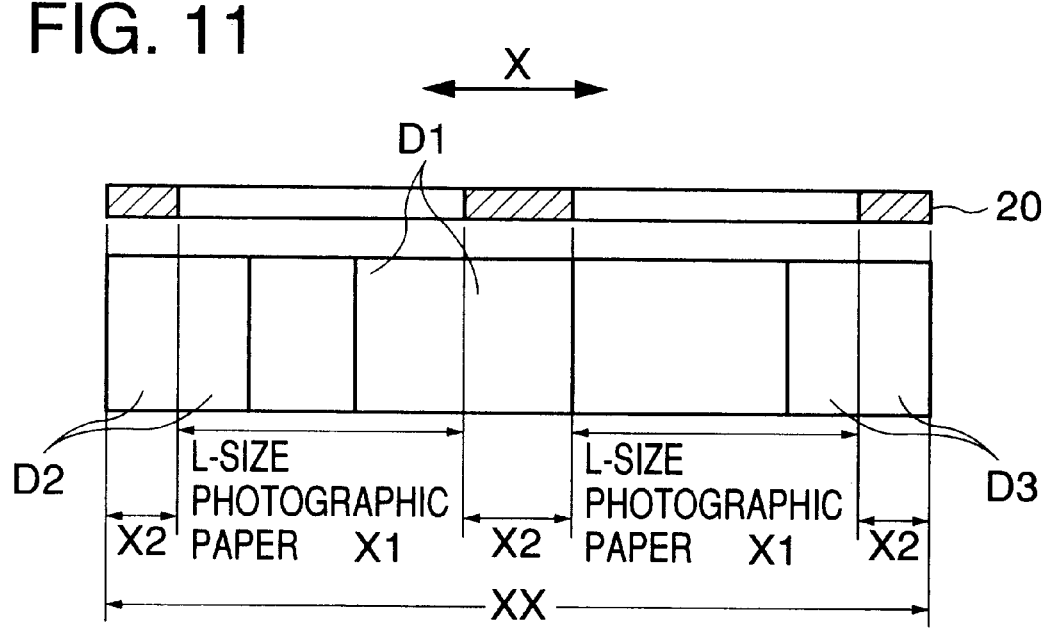
FIG. 11 is an explanatory view showing an interpolation driving condition in another example.

In the example shown in FIG. 11, the non-writing driving of the PLZT optical shutters $B_1$ to $B_n$ and $A_1$ to $A_n$ in the non-writing area X2 is performed based on image data D1 to D3 that are the same as the image data D1 to D3 based on which writing driving of the PLZT optical shutters $B_1$ to $B_n$ and $A_1$ to $A_n$ in the writing area X1 is performed. By doing so, a hysteresis similar to that caused in the writing area X1 can be caused in the non-wiring area X2, and the difference among the driving conditions of the PLZT optical shutters $B_1$ to $B_n$ and $A_1$ to $A_n$ at the pixels at different times is substantially eliminated since it is averaged as the total writing time increases. Particularly, in the interpolation driving in the non-writing area X2 in this example, since the image data D1 to D3 of the part of the writing area X1 adjoining the non-writing area X2 are used, the hysteresis of the PLZT optical shutters in the border between the writing area X1 and the non-writing area X2 are more easily made close to each other, so that the boundary of the writing non-uniformness due to the difference in hysteresis is not so conspicuous on the printed image.

Figure 12:
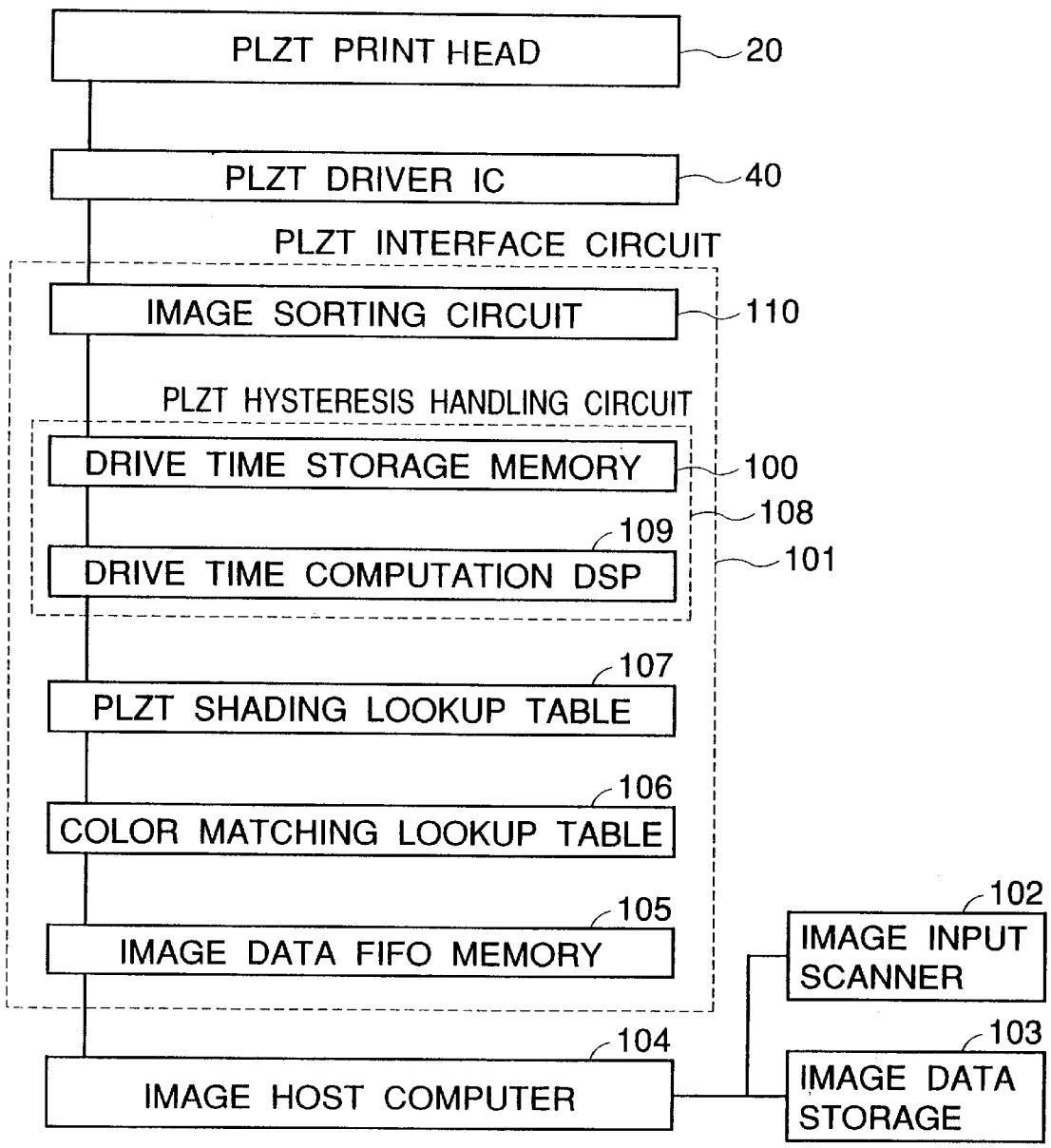
FIG. 12 is a block diagram of a control circuit in a case where the interpolation driving is performed in another example.

In the example shown in FIG. 12, in writing driving for forming one sheet of image, an arrangement is made so that the total drive time tn of each of the PLZT optical shutters $B_1$ to $B_n$ and $A_1$ to $A_n$ corresponding to all the pixels of the PLZT print head 20 or the average total drive time $t_{ave}$ of the total drive times of the optical shutters can be stored, and in accordance with the stored data, the interpolation driving is performed in both of the writing area X1 and the non-writing area X2 or only in the non-writing area X2, thereby eliminating or reducing the difference in hysteresis between the PLZT optical shutters both in the writing area X1 and in the non-writing area X2.

To do so, a drive time storage memory 100 for performing the above-described storage is provided in a PLZT interface 101 disposed between the driver IC 40 shown in FIG. 12 and an image host computer 104 for causing the driver IC 40 to operate in accordance with an image signal. For example, a film image read in by an image input scanner 102 is input to an image data storage 103 and to the image host computer 104. At this time, the image host computer 104 inputs the image data to the PLZT interface 101 through an image data FIFO memory 105. The image data input to the PLZT interface 101 undergo a color adjustment processing with a lookup table 106 for color matching and a processing to correct the non-uniformness among the optical outputs of the PLZT optical shutters $B_1$ to $B_n$ and $A_1$ to $A_n$ with a lookup table 107 for PLZT shading, and are input to a drive time computation DSP 109 of a PLZT hysteresis handling circuit 108 having the drive time storage memory 100. In the DSP 109, the total drive time tn of each of the PLZT optical shutters $B_1$ to $B_n$ and $A_1$ to $A_n$ or the average total drive time $t_{ave}$ of the drive times tn is computed every time an image signal is input, and the result of the computing is input to the drive time storage memory 100.

The image data after the memory processing undergo a processing at an image sorting circuit 110 and are input to the driver IC 40, and image writing is performed by driving of the PLZT optical shutters $B_1$ to $B_n$ and $A_1$ to $A_n$. in accordance with the image signal in the writing area X1.

Here, when the interpolation driving is performed after the period of writing driving for forming one sheet of image, the interpolation driving is performed by non-writing-driving the insufficient ones of the PLZT optical shutters in the writing area X1 so that the maximum total drive time $t_{max}$ of the stored total drive times is achieved and by non-writing-driving each of the PLZT optical shutters in the non-writing area X2 until the maximum total drive time $t_{max}$ is achieved. Consequently, the total drive times of the PLZT optical shutters in the writing area X1 and in the non-writing area X2 are all the maximum total drive time $t_{max}$, so that the difference in optical hysteresis and electric field hysteresis can be eliminated. However, although it is considered that there are hardly any occasions when at least one of the PLZT optical shutters $B_1$ to $B_n$ and $A_1$ to $A_n$ corresponding to the pixels is writing-driven 100% to form one sheet of image, irrespective of whether such an occasion occurs or not, the interpolation driving may be performed so that the total drive time of each of the PLZT optical shutters $B_1$ to $B_n$ and $A_1$ to $A_n$ in the writing area X1 and in the non-writing area X2 is 100%. When this is done, it is unnecessary to store the total drive times of the PLZT optical shutters in writing in the writing area X1. Moreover, in the interpolation driving, the PLZT optical shutters $B_1$ to $B_n$ and $A_1$ to $A_1$ may be driven so that the drive times equal the average total drive time $t_{ave}$.

When the interpolation driving is performed in the same period as the period of writing driving for forming one sheet of image, the interpolation driving for the PLZT optical shutters in the writing area X1 is omitted, and the interpolation driving is performed for each of the PLZT optical shutters in the nonwriting area X2 by the stored average total drive time $t_{ave}$ of the PLZT optical shutters in the writing area X1. In this case, although it does not occur that the drive times of the PLZT optical shutters of the pixels in the writing area X1 and the drive times of the PLZT optical shutters in the non-writing area X2 mostly coincide, compared to the case where such an interpolation driving is not performed, the difference in hysteresis therebetween can be reduced and the difference in density therebetween decreases accordingly. However, in the interpolation driving, the PLZT optical shutters $B_1$ to $B_n$ and $A_1$ to $A_n$ in the non-writing area X2 may be driven so that the drive times coincide with the maximum total drive time $t_{max}$.

In summary, as the period in which the maximum total drive time $t_{max}$ or the average total drive time $t_{ave}$ stored in the memory is used for the interpolation driving in the non-writing area X2, the following three can be considered: after writing driving for forming one sheet of image is finished; in the same period as the period in which the writing driving in the writing area X1 is performed; and between the end of the writing driving for forming one line of image in the writing area X1 and the start of the next writing driving. However, the present invention is not limited to these periods as long as the interpolation driving is possible.

Figure 13:
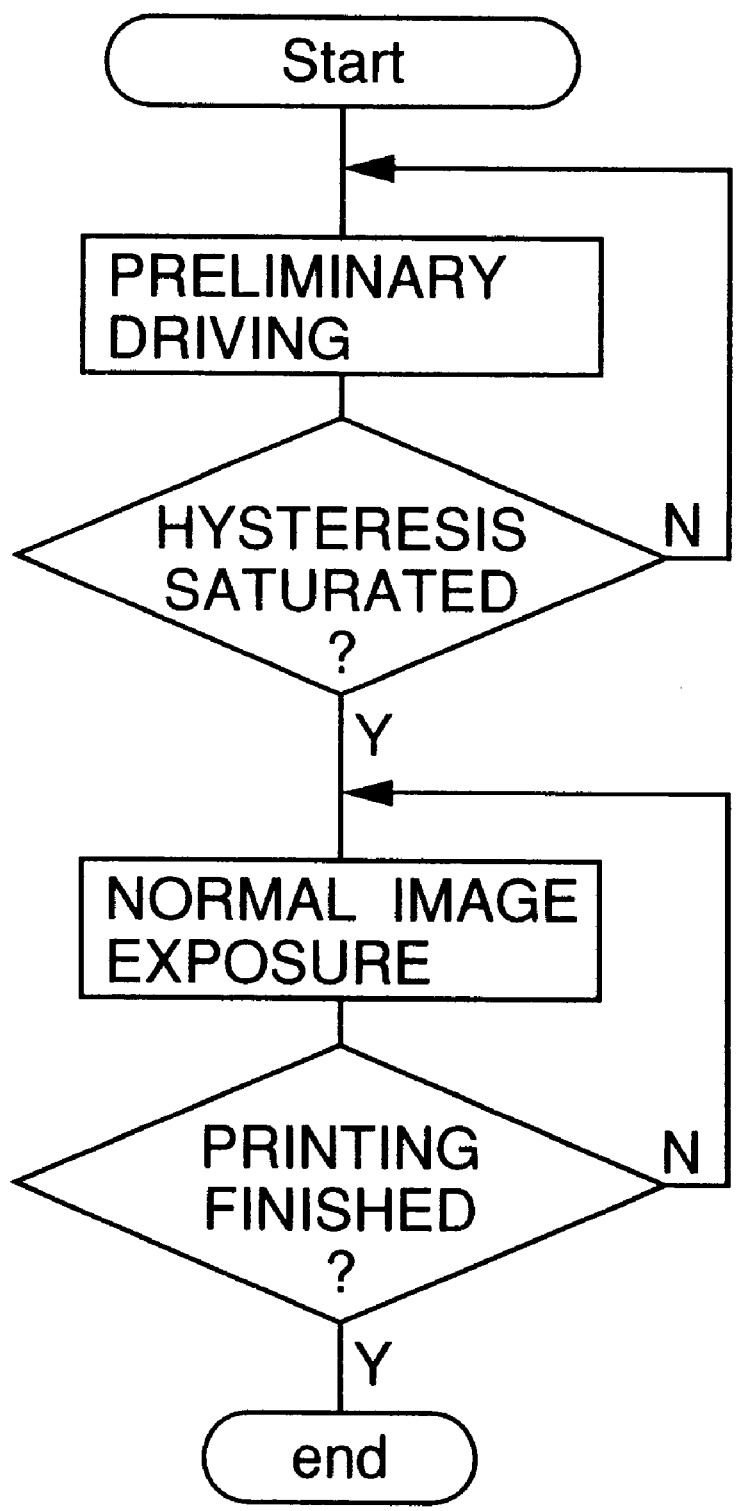
FIG. 13 is a flowchart in a case where a preliminary driving for saturating a hysteresis is performed as the interpolation driving in another example.
Figure 14:
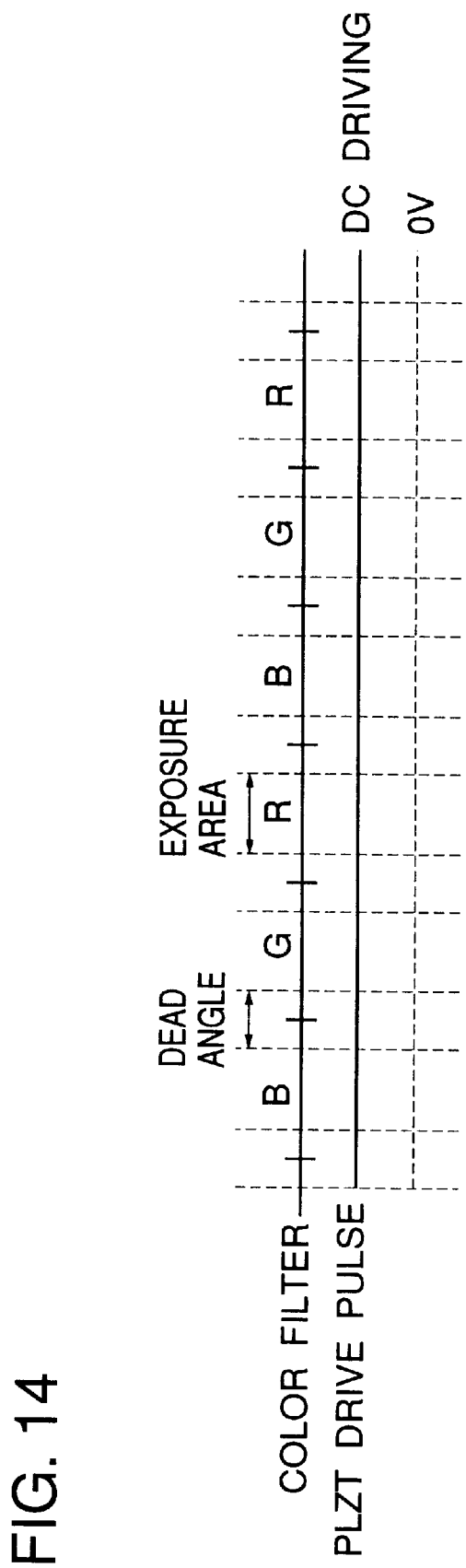
FIG. 14 is a time chart showing a drive pulse at the time of the preliminary driving in the example of FIG. 13.

In the example shown in FIGS. 13 and 14, by applying a predetermined voltage for a predetermined time before writing is performed by driving the PLZT optical shutters of the pixels based on the image data, the difference in hysteresis among the PLZT optical shutters $B_1$ to $B_n$ and $A_1$ to $A_n$ is prevented from being caused even when a writing is performed in which the image size is smaller than the total number of pixels of the PLZT print head 20.

Specifically, as shown in FIG. 13, a preliminary driving at the predetermined voltage is performed as the interpolation driving for the predetermined time until the hysteresis of each of the PLZT optical shutters $B_1$ to $B_n$ and $A_1$ to $A_n$ are saturated, and thereafter, the PLZT optical shutters $B_1$ to $B_n$ and $A_1$ to $A_n$ in the writing area X1 are driven according to the image data until printing is finished. In this example, a constant DC voltage is applied as shown in FIG. 14.

Figure 15:
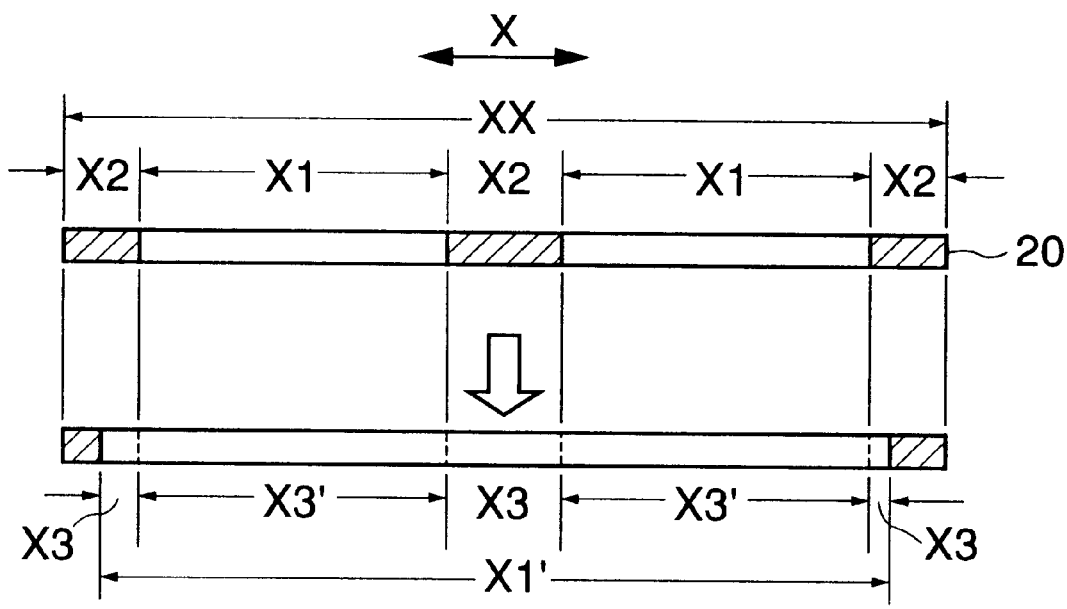
FIG. 15 is an explanatory view in a case where a calibration driving is performed as the interpolation driving in still another example.
Figure 16:
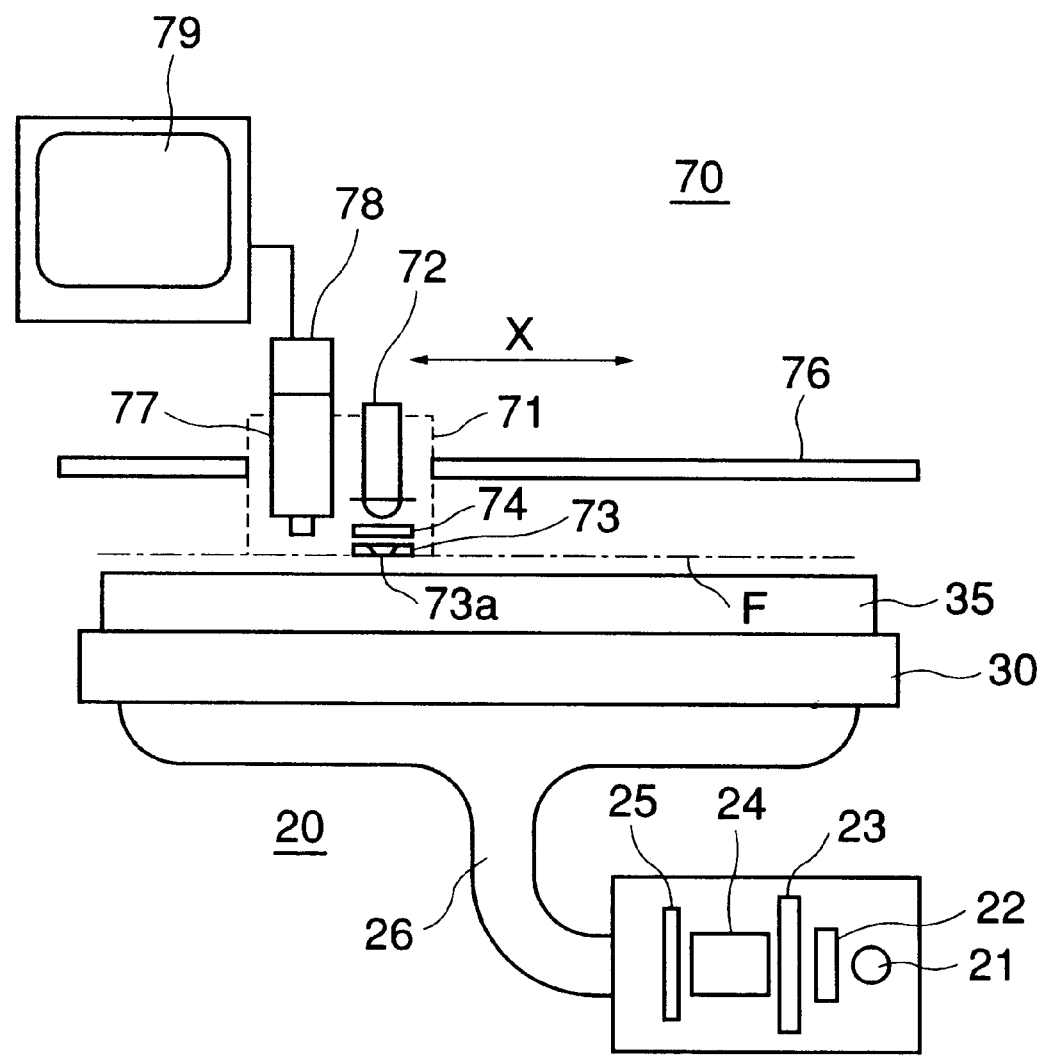
FIG. 16 briefly shows the structure of a measuring device for measuring the light quantity of the optical output of the PLZT print head of FIG. 1.
Figure 17:
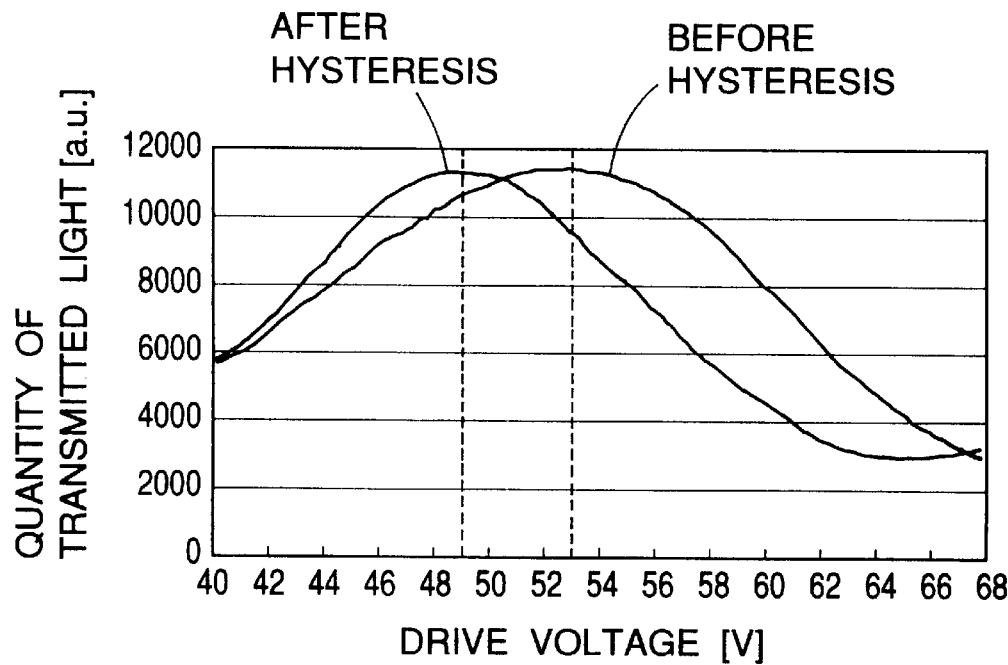
FIG. 17 is a graph showing a variation in voltage according to the presence or absence of a hysteresis due to an electric field.
Figure 18:
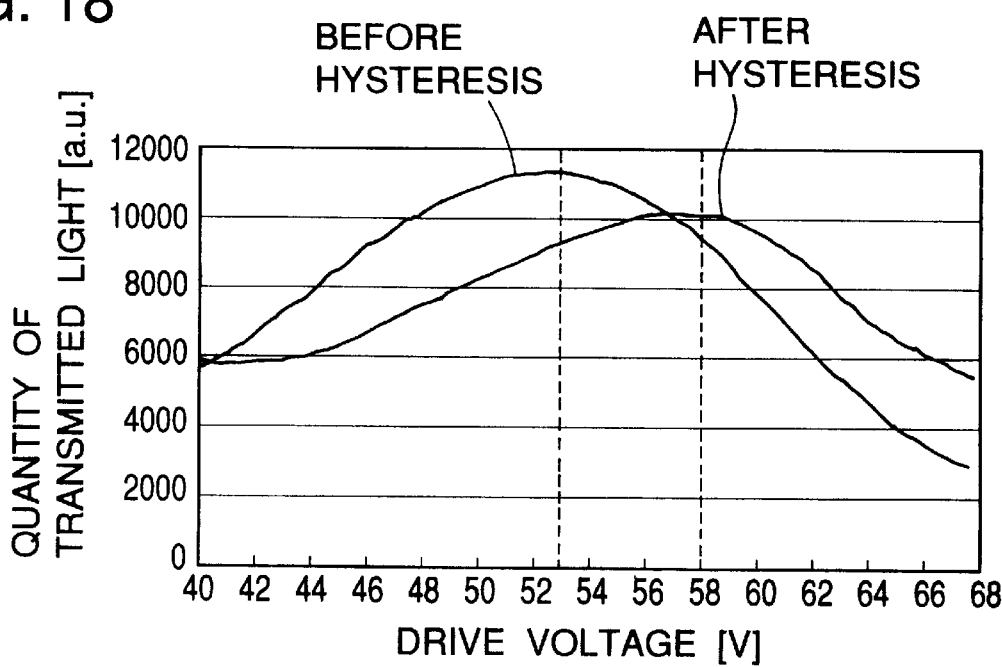
FIG. 18 is a graph showing a variation in voltage according to the presence or absence of a hysteresis due to light.
Figure 19:
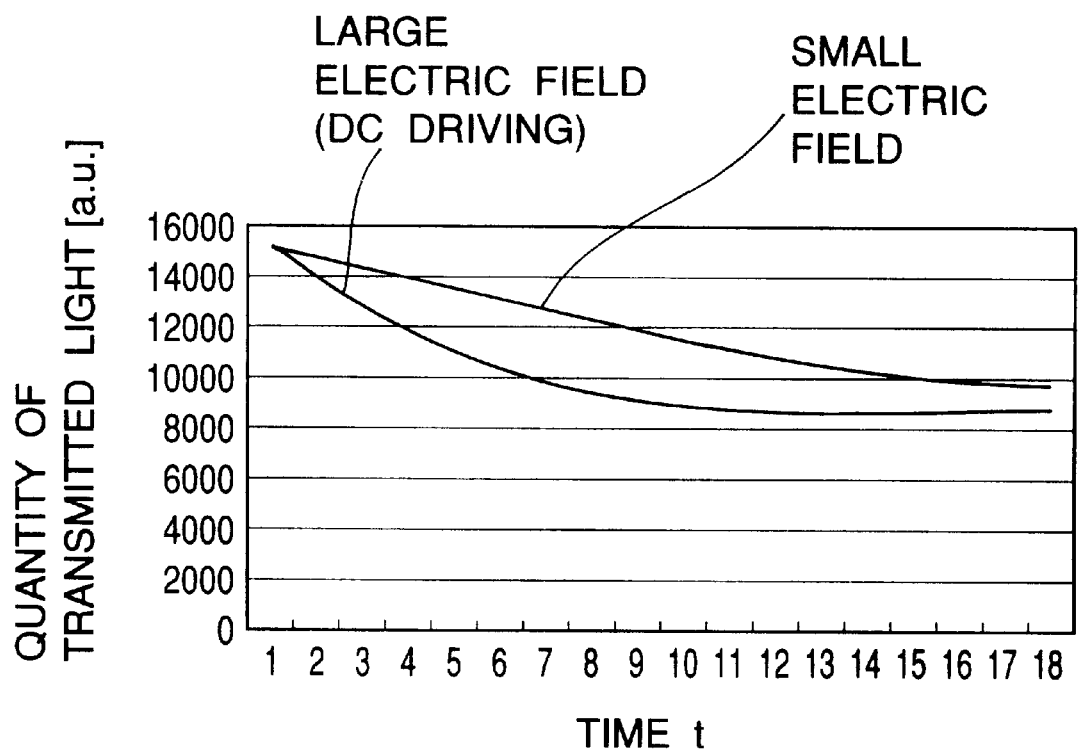
FIG. 19 is a graph showing a variation in drive voltage with time due to the electric field hysteresis.

In the example shown in FIGS. 15 and 16, when at least one present writing area X1' is larger than the preceding writing area X1, a predetermined calibration driving is performed in the present writing driving.

That is, the example is effective when the number of pixels in the present writing area X1' exceeds the number of pixels in the preceding writing area X1, in other words, when the present writing area X1' and the preceding writing area X1 overlap each other, and driving of the PLZT optical shutters corresponding to the pixels in the present writing area X1' is performed as the interpolation driving while performing the calibration driving for calibrating the difference in writing characteristic caused by the difference in hysteresis between the PLZT optical shutters situated in an overlapping area X3' corresponding to the pixels in the preceding writing area X1 and the PLZT optical shutters situated in a non-overlapping area X3 of the present writing area X1' outside the preceding writing area X1.

Thus, even when the present writing area X1' is larger than the preceding writing area X1 and there is a difference in hysteresis between the PLZT optical shutters $B_1$ to $B_n$ and $A_1$ to $A_n$ in the non-overlapping area X3 and in the overlapping area X3', by performing the present writing while performing the operation to calibrate this, the influence of the hysteresis difference can be prevented.

To perform such a calibration operation, the difference in writing characteristic between the PLZT optical shutters $B_1$ to $B_n$ and $A_1$ to $A_n$ is measured from the actual optical outputs of the corresponding PLZT optical shutters $B_1$ to $B_n$ and $A_1$ to $A_n$, and the drive data of the PLZT optical shutters $B_1$ to $B_n$ and $A_1$ to $A_n$ based on the image data are corrected so that the measured difference is calibrated.

For such a purpose and the purpose of preparing the above-described lookup table for PLZT shading, the silver halide printer of this embodiment shown in FIG. 3 is provided with a measuring device 70 as shown in FIG. 16 for measuring the light outputs from the PLZT optical shutters $B_1$ to $B_n$ and $A_1$ to $A_n$ of the PLZT print head 20. The measuring device 70 has a measuring head 71 that scans an imaging surface F for writing by the PLZT print head 20 in the X direction by a light receiving sensor 72 to detect the quantity of the light outputted from the PLZT optical shutters $B_1$ to $B_n$ and $A_1$ to $A_n$, and the scanning is performed by moving the measuring head 71 along a guide 76 in the X direction. The light receiving sensor 72 is situated above the measuring head 71, and detects the optical outputs of the PLZT optical shutters $B_1$ to $B_n$ and $A_1$ to $A_n$ through a mask hole 73a of a mask 73 and an imaging lens 74 situated on the imaging surface F. The measuring head 71 is provided with a CCD camera 77. The output of the camera 77 is transmitted to a monitor 79 through a video controller 78 so that the device can be operated while monitoring the measurement condition.

Obviously, many modifications and variations of the present invention are possible in light of the above teachings. It is therefore to be understood that within the scope of the appended claims, the invention may be practiced other than as specifically described.

What is claimed is:

1. A method of calibrating a plurality of optical output media aligned in one direction to be used in an optical writing apparatus that individually drives the optical output media into on-state wherein light is outputted from the optical output media or off-state wherein no light is outputted from the optical output media based on image data to thereby perform image writing onto a writing area of an object to be written, said method comprising:

a first step of determining whether a number of optical output media corresponding to the writing area is smaller than a total number of optical output media; and a second step of, when the number of optical output media corresponding to the writing area is smaller than the total number of optical output media, driving remaining optical output media other than the optical output media corresponding to the writing are without image writing onto the object.

2. The method as claimed in claim 1, wherein in said second step, output light quantity of each of the remaining optical output media is approximately 50% of a maximum output light quantity of output light quantities of the optical output media corresponding to the writing area.

3. The method as claimed in claim 1, wherein in said second step, the remaining optical output media are driven based on the same image data as the image data for driving the optical output media corresponding to the writing area.

4. The method as claimed in claim 1, wherein in said second step, the remaining optical output media are driven in parallel with the driving of the optical output media corresponding to the writing area for image writing.

5. The method as claimed in claim 1, wherein in said second step, the remaining optical output media are driven independently of the driving of the optical output media corresponding to the writing area for image writing.

6. A method of calibrating a plurality of optical output media aligned in one direction to be used in an optical writing apparatus that individually drives the optical output media into on-state wherein light is outputted from the optical output media or off-state wherein no light is outputted from the optical output media based on image data to thereby perform image writing onto a writing area of an object to be written, said method comprising:

a first step of, when image writing is performed onto the writing area based on the image data, computing an average total drive time of the optical output media corresponding to the writing area during the image writing and storing the computed average total drive time; and a second step of driving remaining optical output media other than the optical output media corresponding to the writing area for a time equal to the average total drive time stored in said first step without image writing onto the object.

7. The method as claimed in claim 6, wherein in said second step, the remaining optical output media are driven in parallel with the driving of the optical output media corresponding to the writing area for image writing.

8. The method of calibrating a plurality of optical output media aligned in one direction to be used in an optical writing apparatus that individually drives the optical output media into on-state wherein light is out-putted from the optical output media or off-state wherein no light is outputted from the optical output media based on image data to thereby perform image writing onto an object to be written, said method comprising:

a first step of performing a preliminary driving of all the optical output media before image writing is performed onto said object based on the image data, wherein in said preliminary driving, all the optical output media is driven at a predetermined voltage for a predetermined time without image writing onto the object until hysteresis of each of the optical output media are saturated; and a second step of, after said preliminary driving, driving the optical output media based on the image data in order to perform image writing onto said object.

9. The method as claimed in claim 8, wherein said predetermined voltage is constant during the preliminary driving.

10. The method as claimed in claim 8, wherein said predetermined voltage for the preliminary driving is a DC voltage.

11. A method of calibrating a plurality of optical output media aligned in one direction to be used in an optical writing apparatus that individually drives the optical output media into on-state wherein light is outputted from the optical output media or off-state wherein no light is outputted from the optical output media based on image data to thereby perform image writing onto a writing area of an object to be written, said method comprising:

a first step of, when image writing is performed onto the writing area based on the image data, determining whether a number of optical output media corresponding to a present writing area of present image writing is greater than a number of optical output media corresponding to a preceding writing area of preceding image writing; and a second step of, when the number of optical output media corresponding to the present writing area is greater than the number of optical output media corresponding to the preceding writing area, performing a calibration to calibrate a difference in writing characteristic due to a difference in hysteresis between optical output media corresponding to both the preceding and the present writing areas and optical output media corresponding to only the present writing area.

12. The method as claimed in claim 11, wherein in said second step, based on a difference in writing characteristic obtained by actual measurement of outputs of the optical output media, the calibration is performed by correcting drive data of the optical output media so that the difference in writing characteristics is calibrated.

* * * * *